(12) United States Patent
Souri et al.

(10) Patent No.: US 9,632,926 B1
(45) Date of Patent: Apr. 25, 2017

(54) MEMORY UNIT ASSIGNMENT AND SELECTION FOR INTERNAL MEMORY OPERATIONS IN DATA STORAGE SYSTEMS

(71) Applicant: Western Digital Technologies, Inc., Irvine, CA (US)

(72) Inventors: Kamyar Souri, Irvine, CA (US); Andrew J. Tomlin, San Jose, CA (US); Dmitry S. Obukhov, San Jose, CA (US); Jing Booth, San Jose, CA (US); Mei-Man L. Syu, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 525 days.

(21) Appl. No.: 14/028,377

(22) Filed: Sep. 16, 2013

Related U.S. Application Data

(60) Provisional application No. 61/824,137, filed on May 16, 2013, provisional application No. 61/824,001, filed on May 16, 2013.

(51) Int. Cl.
*G06F 12/00* (2006.01)
*G06F 12/02* (2006.01)

(52) U.S. Cl.
CPC ...... *G06F 12/0246* (2013.01); *G06F 12/0253* (2013.01)

(58) Field of Classification Search
CPC .................... G06F 12/0246; G06F 12/0253
See application file for complete search history.

(56) References Cited

U.S. PATENT DOCUMENTS

| 6,016,275 | A | 1/2000 | Han |
| 6,230,233 | B1 | 5/2001 | Lofgren et al. |
| 6,594,183 | B1 | 7/2003 | Lofgren et al. |
| 6,850,443 | B2 | 2/2005 | Lofgren et al. |
| 7,353,325 | B2 | 4/2008 | Lofgren et al. |
| 8,254,172 | B1 | 8/2012 | Kan |
| 8,312,207 | B2 | 11/2012 | Merry, Jr. et al. |
| 8,380,946 | B2 | 2/2013 | Hetzler et al. |
| 8,386,700 | B2 | 2/2013 | Olbrich et al. |
| 2004/0088498 | A1* | 5/2004 | Accapadi ............. G06F 9/5016 711/147 |

(Continued)

*Primary Examiner* — David X Yi
*Assistant Examiner* — Alan Otto
(74) *Attorney, Agent, or Firm* — McDermott Will & Emery LLP

(57) ABSTRACT

Disclosed embodiments are directed to systems and methods for assigning and selecting memory units for internal memory operations in data storage systems. The embodiments can improve the efficiency of garbage collection operations by directing dynamic data into memory units with a relatively lower P/E count, directing static and system data into memory units with a relatively higher P/E count, and not mixing static and dynamic data by packing static data into separate memory units from dynamic data. In one embodiment, after completion of garbage collection of blocks, the blocks are each assigned to one of a cool down list and an available memory unit list based on a size limit of the cool down list and a number of program-erase (P/E) operations performed on each block. The blocks are subsequently selected from the lists for write operations according to whether write data includes static or dynamic data.

20 Claims, 7 Drawing Sheets

(56) References Cited

U.S. PATENT DOCUMENTS

| | | |
|---|---|---|
| 2007/0030734 A1* | 2/2007 | Sinclair et al. .......... 365/185.11 |
| 2008/0147998 A1* | 6/2008 | Jeong ............................. 711/161 |
| 2008/0239811 A1 | 10/2008 | Tanaka |
| 2009/0077429 A1 | 3/2009 | Yim et al. |
| 2009/0089485 A1 | 4/2009 | Yeh |
| 2009/0091978 A1 | 4/2009 | Yeh |
| 2009/0113112 A1 | 4/2009 | Ye et al. |
| 2009/0157952 A1 | 6/2009 | Kim et al. |
| 2009/0172258 A1 | 7/2009 | Olbrich et al. |
| 2009/0182936 A1 | 7/2009 | Lee |
| 2009/0216936 A1 | 8/2009 | Chu et al. |
| 2009/0240873 A1 | 9/2009 | Yu et al. |
| 2010/0287328 A1 | 11/2010 | Feldman et al. |
| 2011/0191521 A1* | 8/2011 | Araki et al. .................. 711/103 |
| 2011/0225346 A1 | 9/2011 | Goss et al. |
| 2012/0023144 A1 | 1/2012 | Rub |
| 2012/0066438 A1 | 3/2012 | Yoon et al. |
| 2012/0072654 A1 | 3/2012 | Olbrich et al. |
| 2013/0073788 A1 | 3/2013 | Post et al. |

\* cited by examiner

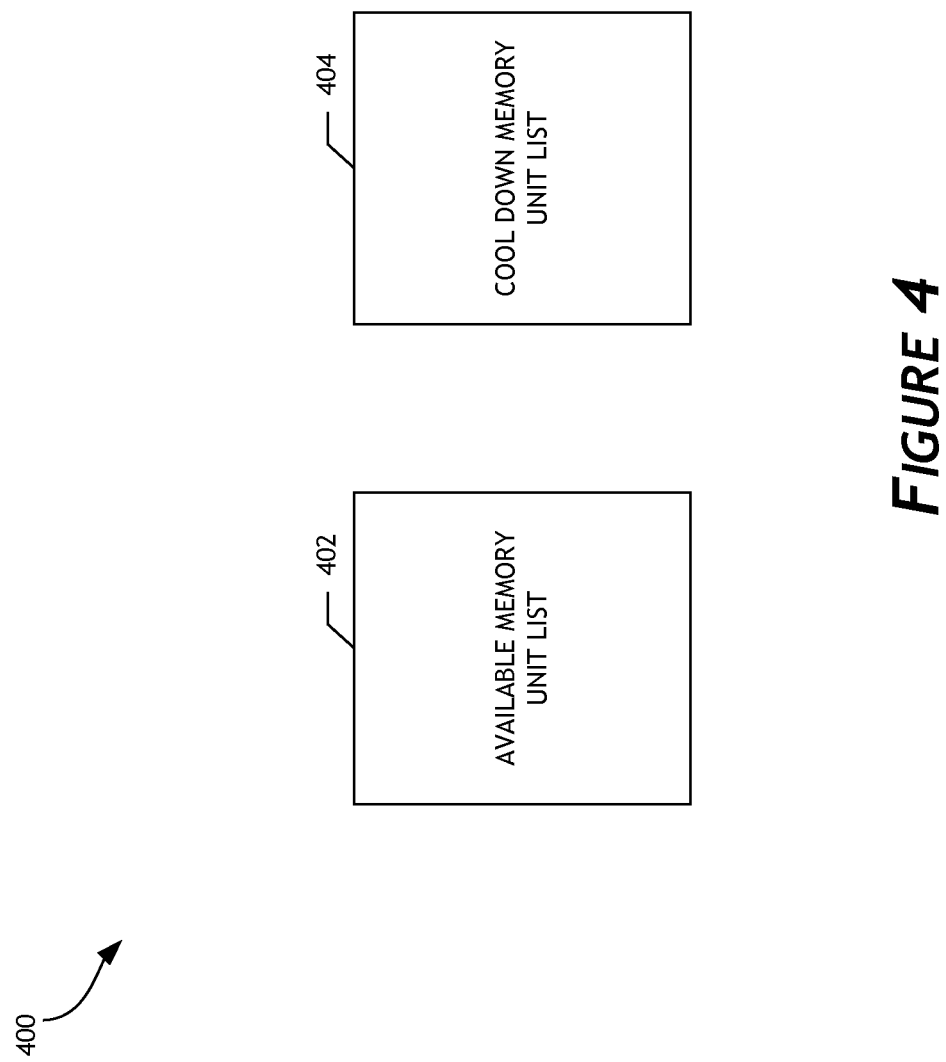

MEMORY UNIT ASSIGNMENT AND SELECTION FOR INTERNAL MEMORY OPERATIONS IN DATA STORAGE SYSTEMS

CROSS REFERENCE TO RELATED APPLICATIONS

This application claims benefit under 35 U.S.C. §119(e) to U.S. Provisional Patent Application No. 61/824,137 entitled "BLOCK SELECTION FOR GARBAGE COLLECTION OPERATIONS IN A SOLID-STATE DATA STORAGE DEVICE" filed on May 16, 2013, and U.S. Provisional Patent Application No. 61/824,001 entitled "STATIC WEAR LEVELING IN A SOLID-STATE DATA STORAGE DEVICE" filed on May 16, 2013; the disclosures of which are hereby incorporated by reference in their entirety.

BACKGROUND

Technical Field

This disclosure relates to data storage systems for computer systems. In particular, this disclosure relates to systems and methods for assigning and selecting memory units for internal memory operations in data storage systems.

Description of the Related Art

Data storage systems execute many housekeeping operations in the course of their normal operation. For example, garbage collection can be performed on memory regions that may contain both valid and invalid data. When a region is selected for garbage collection, the garbage collection operation copies valid data within the memory region to one or more new locations in memory and then erases or frees the entire region, thereby making the region available for future storage of data. However, performing garbage collection involves substantial overhead. Accordingly, it is desirable to provide more efficient garbage collection mechanisms.

BRIEF DESCRIPTION OF THE DRAWINGS

Systems and methods which embody the various features of the invention will now be described with reference to the following drawings, in which:

FIG. 4 is a conceptual diagram illustrating multiple availability lists to which one or more garbage collected memory units can be assigned according to one embodiment of the invention.

DETAILED DESCRIPTION

Figure 1:
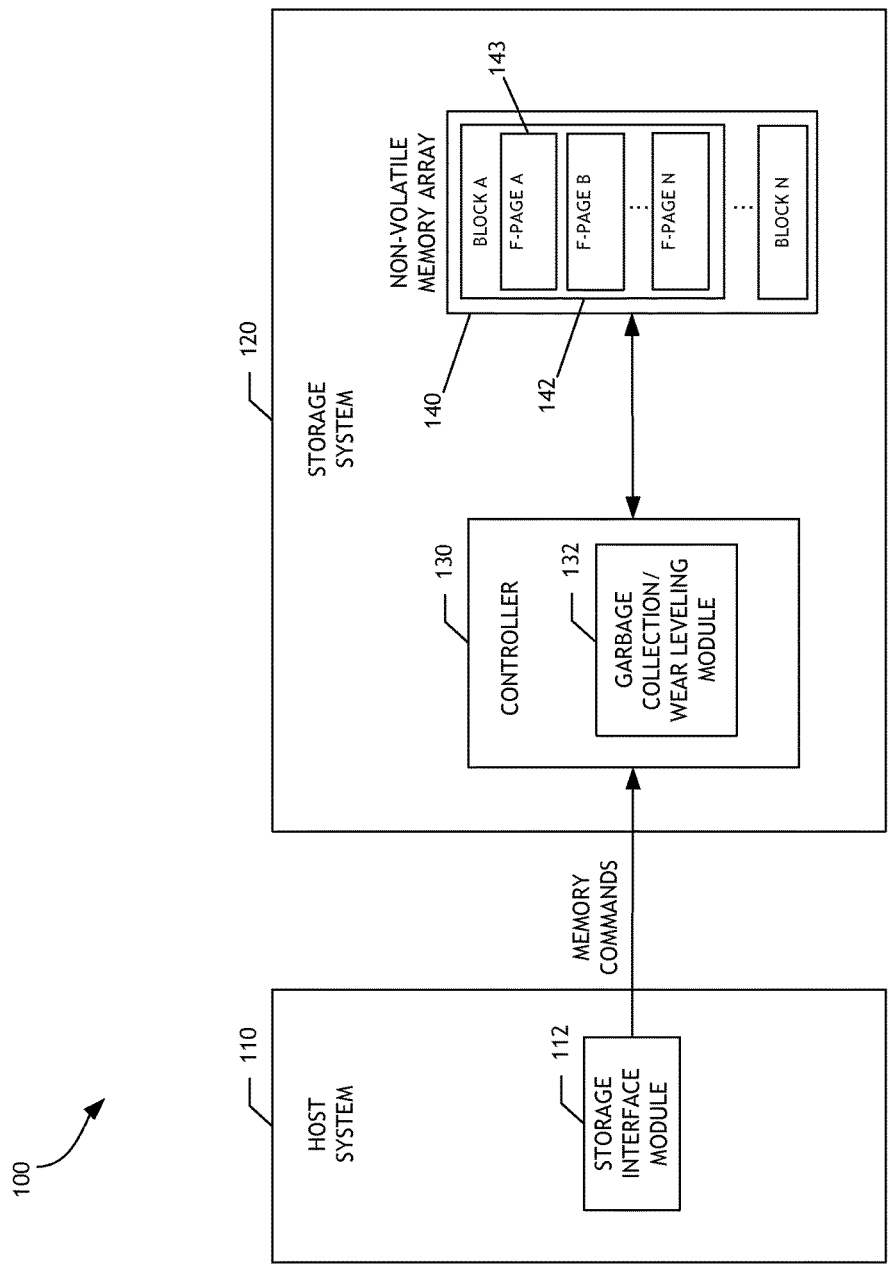
FIG. 1 illustrates a combination of a host system and a data storage system that implements garbage collection and/or static wear leveling according to one embodiment of the invention.

While certain embodiments are described, these embodiments are presented by way of example only, and are not intended to limit the scope of the disclosure. Indeed, the novel methods and systems described herein may be embodied in a variety of other forms. Furthermore, various omissions, substitutions and changes in the form of the methods and systems described herein may be made without departing from the spirit of the disclosure.

Overview

Data storage systems may execute internal memory operations in the course of their normal operation. For instance, garbage collection may be performed on memory units (e.g., blocks) that contain both valid and invalid data. When a memory unit is selected for garbage collection, the garbage collection operation copies valid data within the memory unit to a new location in memory and then erases the entire memory unit, making the entire memory unit available for future data writes. Therefore, the amount of memory freed by the garbage collection process depends on the amount of invalid pages within the memory units selected for garbage collection.

In addition, static wear leveling, which can be considered a sub-part or special case of garbage collection, can be used in data storage systems, like solid-state storage systems, to prolong their lifecycle. A wear leveling operation may involve moving data content in a first memory unit of memory to a second memory unit of memory that has reached a certain program-erase (P/E) level or count because of a recent erase operation. The first memory unit of memory, which has a lower P/E level or count than that of the second memory unit, is then erased and made available for a future write operation. This has the effect of directing future wear toward the less worn first memory unit, and thus the overall process of wear leveling ensures that erase operations are evenly spread across memory units of memory in a data storage system. Since each erase operation increases the wear of a memory unit by incrementally reducing the memory unit's ability to properly retain data content, static wear leveling helps prevent certain memory units from receiving an excessive amount of erase operations relative to other memory units and thus experiencing data failures much earlier than other memory units.

Some embodiments of this disclosure are directed in part to measuring the data age of data and identifying static or dynamic data based on the data age. In this disclosure, data that is or may be frequently overwritten by a host system can be referred to as "dynamic" and/or "hot" data (e.g., data that has been recently written), and data that is or may be infrequently overwritten can be referred to as "static" and/or "cold" data (e.g., data that has been garbage collected). Whether data is dynamic or static can provide an indication of when the data may likely be overwritten by the host system, and accordingly which candidate memory unit to select for a garbage collection operation or allocate for a write operation, for example.

Some embodiments of this disclosure are further directed to systems and methods for improving assignment and selection of memory units for internal operations. Some embodiments improve the efficiency of the internal operations by one or more of the following: (1) avoiding unnecessary relocation of static data; (2) avoiding setting aside memory units with a relatively higher P/E count, which may increase write amplification; (3) decreasing a P/E window size by using memory units with a relatively lower P/E count more often and directing dynamic data into memory units with a relatively lower P/E count; (4) identifying static data; (5) directing static data into memory units with a relatively higher P/E count to cool down the memory units; (6) decreasing a P/E window size through slowing down a wear rate in memory units having a relatively higher P/E count; (7) directing system data into memory units with a relatively higher P/E count; and (8) not mixing static and dynamic data by packing static data into separate memory units from dynamic data, resulting in less free space trapped in memory units storing static data.

System Overview

FIG. 1 illustrates a combination 100 of a host system 110 and a data storage system 120 that implements garbage collection and/or static wear leveling according to one embodiment of the invention. As is shown, the data storage system 120 (e.g., hybrid hard drive, solid state drive, etc.) includes a controller 130 and a non-volatile memory array 140, which comprises one or more blocks of storage, identified as Block "A" (142) through Block "N". Each block comprises a plurality of flash pages (F-pages). For example, Block A (142) of FIG. 1 includes a plurality of F-pages, identified as F-Pages A (143), B, through N. In some embodiments, each "block" is a smallest grouping of memory pages or locations of the non-volatile memory array 140 that are erasable in a single operation or as a unit, and each "F-page" or "page" is a smallest grouping of memory cells that can be programmed in a single operation or as a unit. Other embodiments may use blocks and pages that are defined differently.

The non-volatile memory array 140 may comprise an array of non-volatile memory, such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof. In some embodiments, the data storage system 120 can further comprise other types of storage, such as one or more magnetic media storage modules or other types of storage modules. Moreover, although embodiments of this disclosure may be described in the context of non-volatile memory arrays, the systems and methods of this disclosure can also be useful in other storage systems like hard drives, shingled disk drives, and hybrid disk drives that may have both solid-state storage and magnetic storage components. As such, while certain internal operations are referred to which are typically associated with solid-state storage systems (e.g., "wear leveling" and "garbage collection") analogous operations for other storage systems can also take advantage of this disclosure.

The controller 130 can be configured to receive data and/or storage access commands from a storage interface module 112 (e.g., a device driver) of the host system 110. Storage access commands communicated by the storage interface module 112 can include write data and read data commands issued by the host system 110. Read and write commands can specify a logical address (e.g., logical block addresses or LBAs) used to access the data storage system 120. The controller 130 can execute the received commands in the non-volatile memory array 140.

The data storage system 120 can store data communicated by the host system 110. In other words, the data storage system 120 can act as memory storage for the host system 110. To facilitate this function, the controller 130 can implement a logical interface. The logical interface can present to the host system 110 data storage system memory as a set of logical addresses (e.g., contiguous address) where user data can be stored. Internally, the controller 130 can map logical addresses to various physical locations or addresses in the non-volatile memory array 140 and/or other storage modules.

The controller 130 includes a garbage collection/wear leveling module 132 configured to perform garbage collection and wear leveling. As used herein, a wear leveling operation can be considered a sub-part of, or a special case of, an overall garbage collection operation. In some embodiments, the garbage collection/wear leveling module 132 performs solely wear leveling while, in other embodiments, performs garbage collection and/or wear leveling of at least a portion of the non-volatile memory array 140. In one embodiment, the garbage collection/wear leveling module 132 may prevent abnormal increases or spikes in write amplification while performing static wear leveling using the approaches described in this disclosure.

In one embodiment, the garbage collection/wear leveling module 132 can select blocks of the non-volatile memory array 140 on which garbage collection and/or wear leveling is performed. Such block picking functionality may be performed based at least in part on information related to data age and/or wear leveling. The blocks may be picked in a way that increases the amount of free space through the life of the data storage system 120 and promotes or guarantees that blocks stay within a range of P/E counts, which may maximize the data storage life of the non-volatile memory array 140.

Data Age

The garbage collection/wear leveling module 132 and/or the controller 130 can determine or estimate the data age of data stored in the non-volatile memory array 140 based at least on when the controller 130 wrote the data to the non-volatile memory array 140 (e.g., according to instructions from the host system 110). In one embodiment, when the controller 130 receives a command to write data, the controller 130 can execute the write command in one or more blocks of the non-volatile memory array 140. Upon successful execution of the write command, the newly written data can be associated with or assigned a lowest data age value, such as a data age of 0. Subsequently, the data age of this data may increase over time until the controller 130 executes a command from the host system 110 to erase this data. Internal memory operations (e.g., garbage collection or static wear leveling) by the storage system 120 may not reset the data age associated with the data in some implementations.

In one embodiment, when the controller 130 writes a block with data from the host system 110, a timestamp is stored as a block attribute of the block or saved to an area of the memory reserved for system information. The timestamp can be stored relative to, for instance, a counter maintained by the controller 130, such as a counter that counts a power on time since manufacturing for the storage system 120. The counter can have a resolution of one or more seconds or a fraction of a second. Based on this counter, the data age of the data stored in blocks of the non-volatile memory array 140 can be determined using Equation 1:

$$DataAge_{Block} = Time_{Now} - TimeStamp_{Block} \quad \text{(Equation 1)}$$

where $Time_{Now}$ corresponds to a time when the data age of the data stored to a block is determined, $TimeStamp_{Block}$ corresponds to the time indicated by the timestamp for the block, and $DataAge_{Block}$ corresponds to the data age of the stored data.

Additionally, the data ages can be truncated, rounded, or normalized (e.g., to a value in a range of 0 to 1) in some implementations to facilitate easier processing or storage of the data ages. For example, the timestamp can be normalized relative to a maximum data age, according to Equation 2:

$$RelativeAge_{Block} = \frac{DataAge_{Block}}{MaximumAge} \quad \text{(Equation 2)}$$

where $DataAge_{Block}$ corresponds to an absolute data age of the data stored to a block, MaximumAge corresponds to a maximum data age normalizing value, and $RelativeAge_{Block}$ corresponds to the relative data age of the data of the block. The maximum data age, in one embodiment, can equal either (1) an oldest data age of the data stored in the non-volatile memory array 140 or (2) a value proportional to a storage size of the non-volatile memory array 140 (e.g., a value proportional to a write time for filling the non-volatile memory array 140 with data). The maximum data age further may be determined according to Equation 3:

$$MaximumAge = Min(N \times DriveFillTime, DataAge_{max}) \quad \text{(Equation 3)}$$

where DriveFillTime corresponds to a time to fill the non-volatile memory array 140 with data, N corresponds to a multiplier controllable to scale DriveFillTime, and $DataAge_{max}$ corresponds to a maximum absolute data age of data stored to the non-volatile memory array 140. In one embodiment, the value of N can be determined according to Equation 4:

$$N = \frac{MaxDeltaPE}{2} \quad \text{(Equation 4)}$$

where MaxDeltaPE corresponds to a size of a P/E window for the non-volatile memory array 140.

The garbage collection/wear leveling module 132 can issue a garbage collection command that involves multiple blocks of the non-volatile memory array 140 in a single operation. For instance, in one garbage collection operation, the garbage collection/wear leveling module 132 can issue a command for the controller 130 to write valid data stored in two or more blocks to a single free block. Since each of the two or more garbage collected blocks may have a different data age associated with the valid data stored in the block, the garbage collection/wear leveling module 132 may further determine an assigned data age for the valid data written to the single block. In one embodiment, a highest, median, average, or lowest data age associated with the garbage collected data can be assigned to the single block. In another embodiment, a weighted average of the data ages can be assigned using Equation 5:

$$DataAge_{ColdBlock} = \sum_{i=1}^{N} \frac{ValidCount_i \times DataAge_i}{N} \quad \text{(Equation 5)}$$

where $ValidCount_i$ corresponds to an amount of valid data in an $i^{th}$ block, $DataAge_i$ corresponds to the data age of the data stored in the $i^{th}$ block, N corresponds to the number of garbage collected blocks, and $DataAge_{ColdBlock}$ corresponds to the assigned data age for the single block.

The data age assigned to data can be used to classify the data age relative to data age ranges. That is, when the data age of data stored in a block falls within one of the multiple data age ranges, the data stored in the block can be classified as within or part of the data age range. For example, data can be classified as within a relatively low data age range, a medium data age range, and a relatively high data age range in one implementation. The multiple data age ranges can be separated by thresholds usable to determine whether the data age of particular data is within a certain data age range. In one embodiment, the multiple data age ranges include a static data age range and a dynamic data age range, and the static and dynamic data age ranges are separated by a static-dynamic data threshold. For instance, data having a relative data age meeting a static-dynamic data threshold (e.g., equal to a relative data age of 0.8, 0.9, or 1.0) can be classified as static data while data having a relative data age not meeting the static-dynamic data threshold can be classified as dynamic data.

Garbage Collection

Figure 2:
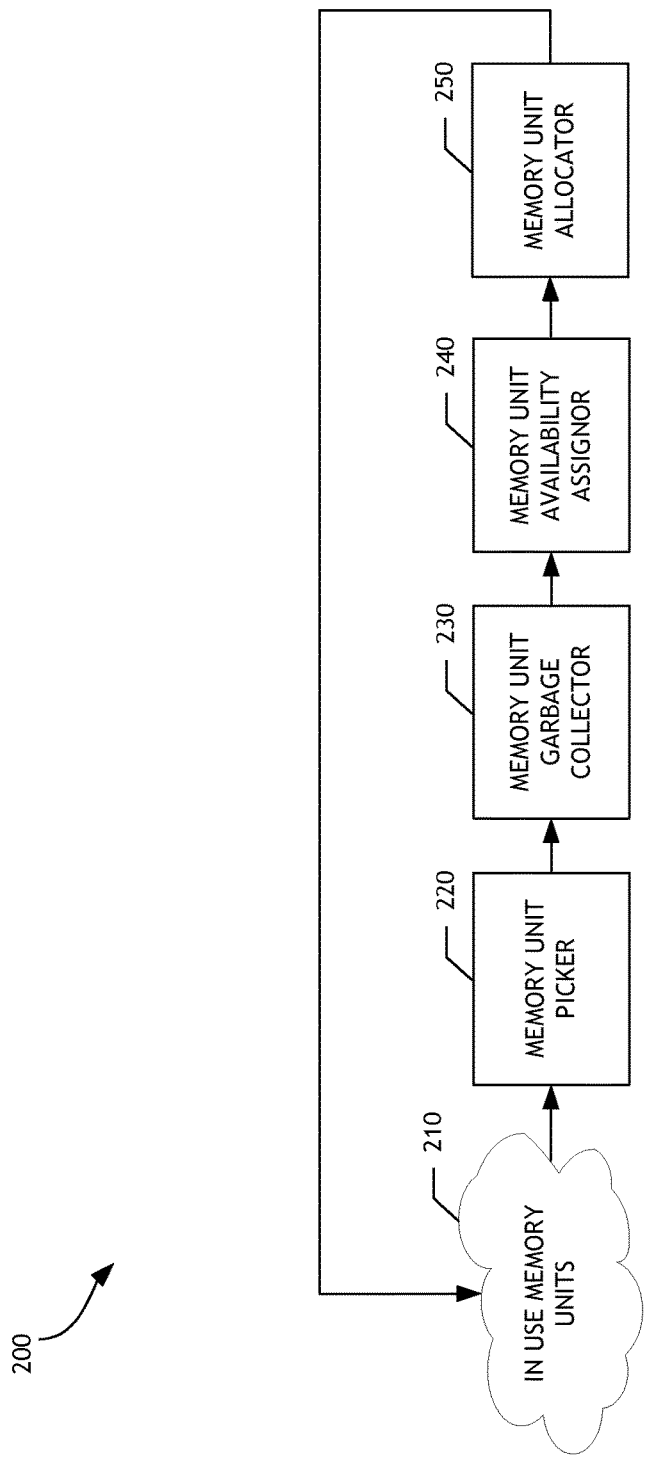
FIG. 2 is a flowchart that shows an overall garbage collection management and memory unit selection scheme according to one embodiment of the invention.

FIG. 2 is a flowchart that shows an overall garbage collection management and memory unit selection scheme 200 according to one embodiment of the invention. One or more modules of FIG. 2 can be implemented by the garbage collection/wear leveling module 132 and/or the controller 130 of the data storage system 120.

The memory unit picker 220 can select one or more memory units from the in use memory units 210 for garbage collection by the memory unit garbage collector 230. The memory unit picker 220 includes intelligence for picking the one or more best memory units for garbage collection or wear leveling. The memory unit picker 220 may be aware of a current internal memory system activity, such as garbage collection or static wear leveling, and select the memory unit(s) accordingly. The memory unit picker 220 further can be aware of a wear level or data age of memory units and use one or both of these metrics in selecting memory units for garbage collection.

When a data storage system is not performing wear leveling, the memory unit picker 220 may preferably select memory units that free a maximum amount of space, resulting in a relatively high device performance. In one embodiment, the memory unit picker 220 selects memory units at least in part according to the following algorithm:

1. Calculate a score for the memory units based on cleaning cost
2. Calculate a score for the memory units based on dwell time
3. Calculate an aggregate score (some combination of cleaning cost and dwell time) over the memory units
4. Pick the memory unit having maximum aggregate score For instance, the cleaning cost and the cleaning cost score for each memory unit may be calculated based on Equations 6 and 7, respectively:

$$\text{Cleaning cost} = \frac{\text{Size of valid data}}{\text{Effective size of memory unit}} \quad \text{(Equation 6)}$$

$$\text{score}_{Cleaning\ cost} = 1 + \text{Cleaning cost} \quad \text{(Equation 7)}$$

Figure 3A:
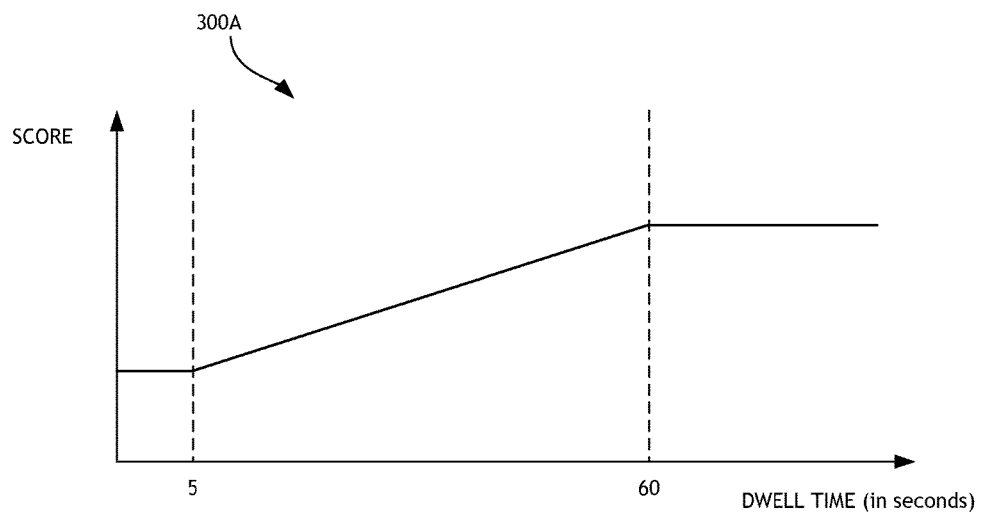
FIGS. 3A and 3B are graphs illustrating dwell time versus score for a data storage system according to one embodiment of the invention.
Figure 3B:
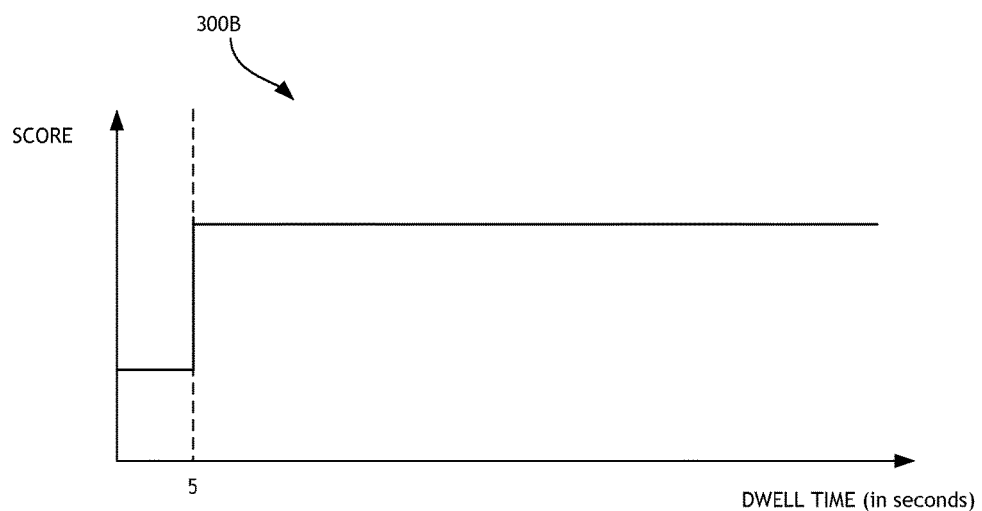

The dwell time score for each memory unit may be calculated in some implementations based on the elapsed time from a last activity on that memory unit. For example, the score can be calculated using a score function 300A illustrated in FIG. 3A where the score of the memory unit increases gradually over a window of dwell times until a maximum dwell time score is reached. FIG. 3B illustrates an alternative dwell time score function 300B where the dwell time function resembles a step function such that after a threshold dwell time is reached (e.g., at 5 seconds), a maximum dwell time score is returned.

In one embodiment, the memory unit picker 220 operates in at least one of two modes: (1) a static memory unit selection mode and (2) a dynamic memory unit selection mode. In the static memory unit selection mode, one or more memory units containing static data are solely or primarily selected for garbage collection and may be selected based on the data age of data stored in the memory units. In the dynamic memory unit selection mode, one or more memory units containing dynamic data are solely or primarily selected for garbage collection and may be selected based on the amount of invalid data stored in the memory units. Whether the memory unit picker 220 operates in the static or dynamic memory unit selection mode can depend at least in part on the data type, band (e.g., where hot band data corresponds to host data, cold band data corresponds to garbage collected data, system band data corresponds to system data), or age of data allocated to one or more particular memory units by the memory unit allocator 250, in some implementations.

Upon completion of a garbage collection operation, the memory unit availability assignor 240 can assign each garbage collected memory unit to one of multiple availability lists to facilitate wear leveling of the memory units. The assignment of each garbage collected memory unit can, in one embodiment, depend at least on a P/E count for each garbage collected memory unit. The multiple availability lists thus can, for instance, allow for the separation of relatively lower P/E count memory units from relatively higher P/E count memory units. In one implementation, each garbage collected memory unit is assigned to one of an available memory unit list 402 and a cool down memory unit list 404 of a list set 400 illustrated in FIG. 4. The available memory unit list 402 can include memory units having a relatively lower P/E count (e.g. below a P/E count threshold), and the cool down memory unit list 404 can include memory units having a relatively higher P/E count (e.g., meeting a P/E count threshold). In addition, some of the multiple availability lists may have a limited capacity (e.g., 1, 3, 10, 20, and the like) such that only a certain number of memory units can be added to the list. For example, the cool down memory unit list 404 may have a limited capacity of two memory units, and once full, newly garbage collected memory units are assigned to another availability list, such as the available memory unit list 402.

In one implementation, garbage collected blocks of the non-volatile memory array 140 having a relatively higher P/E count are separated from garbage collected blocks having a relatively lower P/E count using an available block list and a cool down block list, according to the following algorithm:

IF block ΔP/E count>threshold AND LEN(cool down list)<size limit of cool down THEN
    Place the block in the cool down block list
ELSE
    Place the block in an available memory block list.

where block ΔP/E count corresponds to P/E count of a current block less a value such as the P/E window start of a P/E window, threshold corresponds to a minimum P/E count before blocks are added to the cool down block list, LEN (cool down list) corresponds to a number of blocks currently in the cool down list, and size limit of cool down corresponds to the capacity limit of the cool down list.

The memory unit allocator 250 allocates data to be written to one or more memory units selected from the multiple availability lists. For instance, depending on the type, band (e.g., where hot band data corresponds to host data, cold band data corresponds to garbage collected data, system band data corresponds to system data), or age of data to be written, the memory unit allocator 250 intelligently selects one or more memory units from the multiple availability lists and allocates particular write data to the one or more memory units.

In one example, where the availability lists include an available memory unit list and a cool down memory unit list, the memory unit allocator 250 typically selects memory units from the availability lists based on whether write data is hot, cold, or system band data. For example, the memory unit allocator 250 can typically select a memory unit from the available memory unit list if there is hot band data to be written. Since a block from the available memory unit list may have a relatively lower P/E count, the selected block may likely and acceptably undergo an additional P/E cycle relatively soon after the hot band data is written to the selected block. If there is cold band data to be written, the memory unit allocator 250 can typically select a memory unit from the cool down memory unit list, and if the cool down memory unit list is empty, select a memory unit from the available memory unit list. Since a block from the cool down memory unit list may have a relatively higher P/E count, the selected block may not likely undergo an additional P/E cycle relatively soon after the cold band data is written to the selected block. Further, if there is system band data to be written, the memory unit allocator 250 can allocate a memory unit from the available memory unit list or the cool down memory unit list using a similar approach as for cold band data.

As described above, the static or dynamic memory unit selection mode used by the memory unit picker 220 can depend on the type, band, or age of data to be written. The following table additionally illustrates the correlation between the memory unit picking mode of the memory unit picker 220 and the selected memory unit allocation list by the memory unit allocator 250, according to one embodiment:

| Selected Memory Unit Allocation List | Memory Unit Picking Mode |
| --- | --- |
| Available Memory Unit List | Select Block(s) with Dynamic Data |
| Cool Down Memory Unit List | Select Block(s) with Static Data |

The memory unit allocator 250 can perform memory unit allocation based on one or more considerations. For example, the memory unit allocator 250 may control write data allocated to a memory unit based in part on the wear level of the memory unit. In one implementation, the allocation performed by the memory unit allocator 250 is as follows: a wear leveling activity starts with allocating a memory unit from a cool down list. As wear leveling may not free up any space, back-to-back wear leveling attempts on a memory unit may desirably be prevented. Accordingly, on memory unit allocation for cold band data, which could be considered static data in one embodiment, the following algorithm may be used:

IF LEN(cool down list)>0 AND WearLevelingIsAllowed THEN
    Allocate a memory unit from the cool down memory unit list
    Set WearLevelingInProgress
ELSE
    Allocate a memory unit from the available memory unit list
    Clear WearLevelingInProgress.

where LEN(cool down list) corresponds to a number of blocks currently in the cool down list, WearLevelingIsAllowed corresponds to a flag indicative of whether wear leveling is enabled, WearLevelingInProgress corresponds to a flag indicative of whether wear leveling is in progress. Similarly, on memory unit allocation for system band data, which could be considered static data in one embodiment, the following algorithm may be used:

IF LEN(cool down list)>0 THEN
    Allocate a memory unit from the cool down memory unit list
ELSE
    Allocate a memory unit from the available memory unit list.

The memory unit picker 220 and the memory unit allocator 250, in certain embodiments, distinguish static data from dynamic data in order to prevent mixing static and dynamic data, helping to decrease write amplification. Static data written by a host system has the benefit of being written infrequently. When static data can be detected and consolidated into separate memory units by the memory unit allocator 250, the memory units including consolidated static data may have minimal or no invalid space included in these memory units over the life of a data storage system since the consolidated static data may be infrequently erased by the host system. Such memory with consolidated static data thus may require relatively infrequently garbage collection. In addition, the memory units storing consolidated static data can, in one embodiment, be subtracted in an overprovisioning calculation for a data storage system since static data may not mixed with dynamic data and may not be relocated unnecessarily during garbage collection operations. Overprovisioned memory units can accordingly be presumed to apply to a remainder of the data storage system that serves dynamic data, providing a larger effective overprovision amount for the data storage system, less write amplification, and longer device lifetime.

Figure 5:
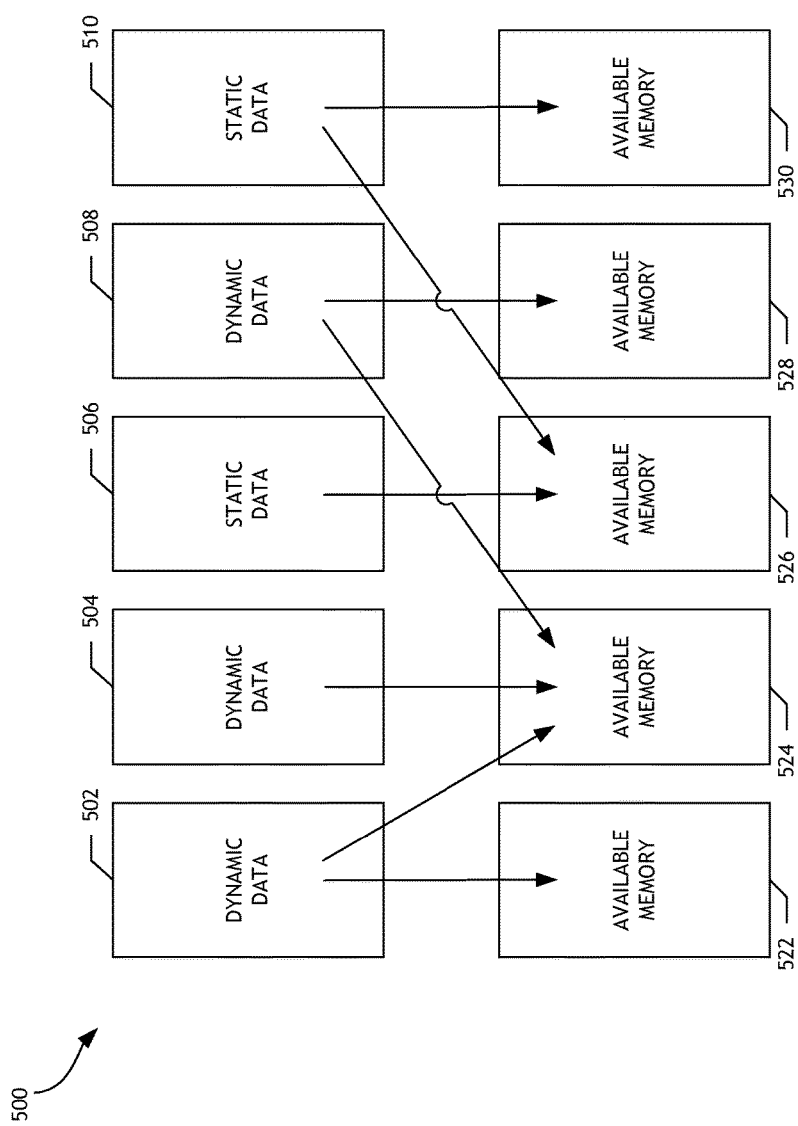
FIG. 5 is a conceptual diagram that illustrates consolidating of valid dynamic data in available memory units separate from static data according to one embodiment of the invention.

In one implementation, dynamic and static data can be consolidated into available memory units during a garbage collection operation as illustrated by the conceptual diagram 500 of FIG. 5. The memory units 502, 504, 506, 508, and 510 are garbage collected memory units, such as blocks, storing dynamic data or static data. The memory units 522, 524, 526, 528, and 530 are available memory units, such as memory units selected from one or more of the multiple availability lists, usable to store garbage collected data. As shown in FIG. 5, valid dynamic data can be consolidated into the memory units 522, 524, and 528 while static dynamic data separately can be consolidated into the memory units 526 and 530. For instance, in sequential operations, valid dynamic data from the memory unit 502 can be relocated to the memory unit 522 until the memory unit 522 fills to capacity, and then the remaining valid dynamic data from the memory unit 502 can be relocated to the next available memory unit 524. Valid dynamic data from the memory unit 504 can further be relocated to the memory unit 524. Subsequently, valid static data from the memory unit 506 may be relocated to the memory unit 526. In a next operation, valid dynamic data from the memory unit 508 can be relocated to the memory unit 524 until the memory unit 524 fills to capacity, and the remainder can be moved to the memory unit 528. Valid static data from the memory unit 510 can further be relocated to the memory unit 526 and 530 in a following operation.

In some embodiments, to prevent mixing static and dynamic data, an active garbage collection operation can be terminated by hardware and/or firmware before all data from a particular source memory unit has been garbage collected. Consider the example of the source memory unit 502, which contains dynamic data. The garbage collection process may be moving valid data from the memory unit 502 to a partially-filled destination memory unit 522, and may subsequently fill it to capacity. At this point, there remains additional valid data from the source memory unit 502 which needs to be written to another available memory unit. However, if the next available memory unit is taken from the cool down list, writing the remaining data from the source memory unit 502 to a memory unit from the cool down list may result in dynamic data mixing with static data.

In one embodiment, the memory unit selection process as described above is executed upon a destination memory unit reaching its capacity. The net effect is that a different operation may be performed (e.g., static wear leveling in place of garbage collection), resulting in the selection of a different source memory unit (e.g., memory unit 506, a unit with static data) when switching to a new destination memory unit taken from the cool down list (e.g., memory unit 524). In other words, to avoid the mixing of dynamic and static data, an in-process static wear leveling or a garbage collection operation can be temporarily interrupted at the boundary of a destination memory unit, and the selection process as described above may result in switching to a different operation (garbage collection to static wear leveling, or vice versa). Advantageously, this may facilitate switching between a garbage collection operation involving collecting dynamic data and wear leveling involving collecting static data, without mixing the static and dynamic data. Such functionality may in addition provide the ability to maximize the random write performance and minimize the write amplification due to static wear leveling.

Figure 6:
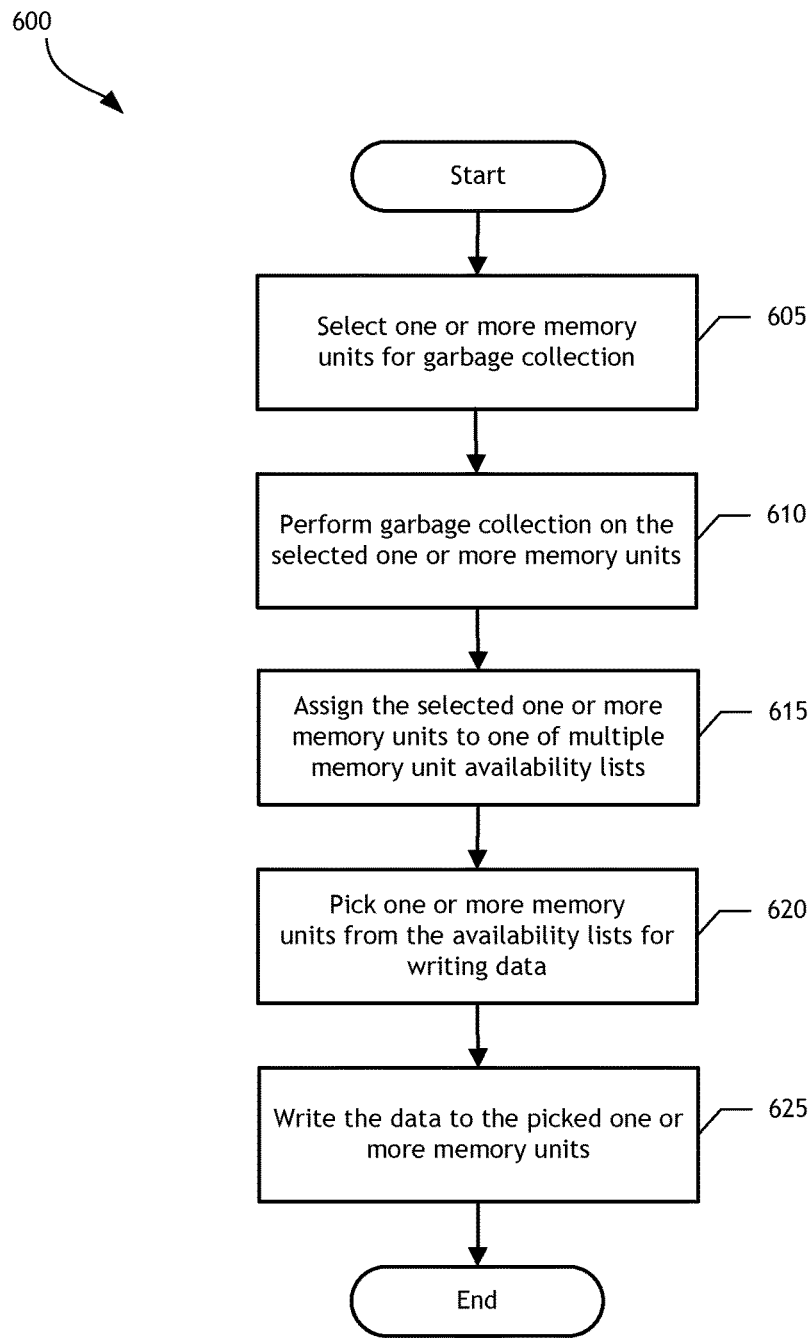
FIG. 6 is a flow diagram illustrating a process for completing a garbage collection operation according to one embodiment of the invention.

FIG. 6 is a flow diagram illustrating a process 600 for completing a garbage collection operation according to one embodiment of the invention. In some embodiments, the controller 130 and/or the garbage collection/wear leveling module 132 are configured to perform the process 600.

At block 605, the process 600 selects one or more memory units for a garbage collection operation. The one or more memory units can be selected based at least in part on a wear level of the memory unit(s) (e.g., a P/E count), a data age of the data stored in the memory unit(s), or a mode setting such as a static and dynamic memory unit selection mode. At block 610, the process 600 performs the garbage collection operation on the selected one or more memory units.

At block 615, the process 600 assigns the selected one or more memory units to one of multiple memory unit availability lists. For instance, each memory unit can be assigned to one of a first list (e.g., an available memory unit list) and a second list (e.g., a cool down memory unit list). Each memory unit can be assigned according to one or more of the criteria or algorithms discussed in this disclosure. In other embodiments, additional lists may be used.

At block 620, the process 600 picks one or more memory units from the availability lists for writing data. For example, valid static data that has been garbage collected can be relocated to one or more memory units selected from the cool down memory unit list, and host write data or valid dynamic data that has been garbage collected can be relocated to one or more memory units selected from the available memory unit list. At block 625, the process 600 writes the data to the picked one or more memory units.

Figure 7:
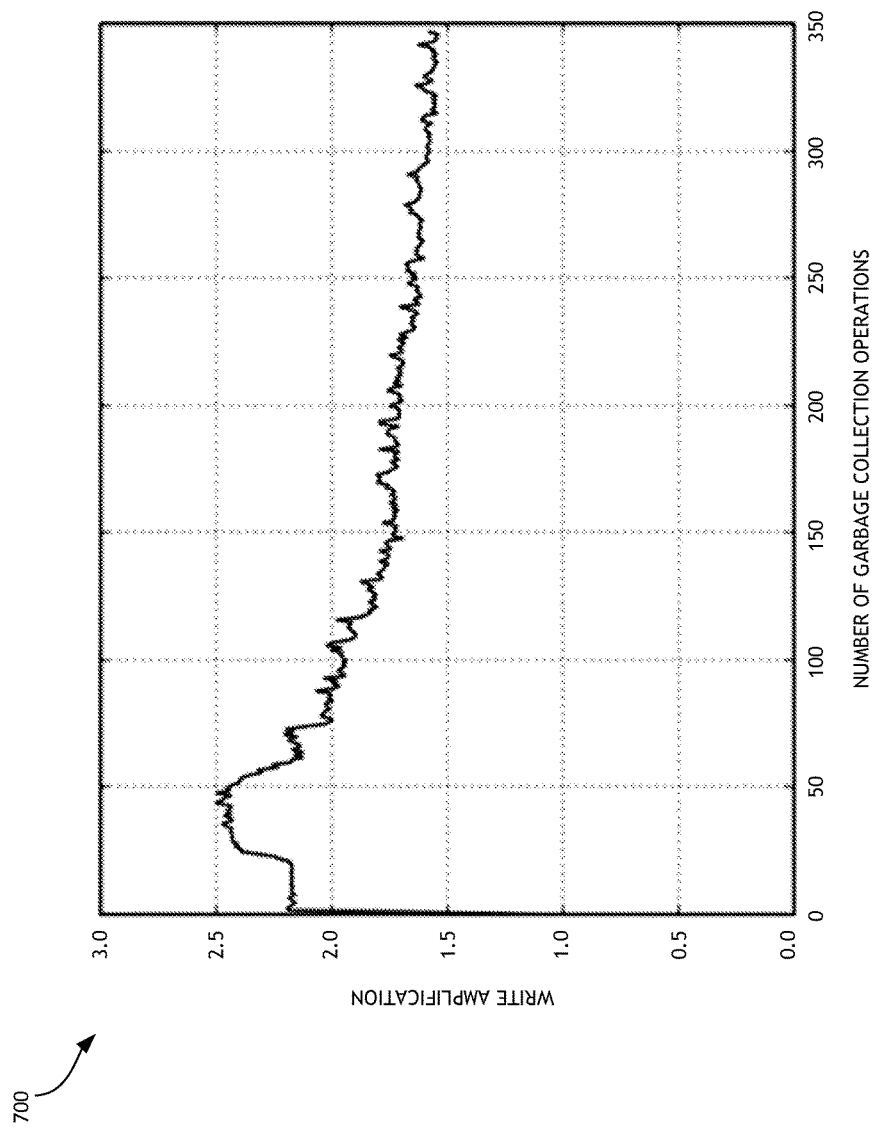
FIG. 7 is a graph illustrating potential write amplification decreases over time based on the application of features disclosed herein according to one embodiment of the invention.

FIG. 7 is a graph 700 illustrating potential write amplification decreases over time based on the application of features disclosed herein. For example, the graph 700 may correspond to a 32 GB data storage system that is being filled with random 4 KB writes for 5 times, where 50% of the stored data in the data storage system may be considered static and the remaining 50% of the stored data is being written with random 4 KB writes over and over. As can be seen from FIG. 7, the write amplification for the data storage system advantageously diminishes over time as the number of performed garbage collection operations increases.

Other Variations

While certain embodiments have been described, these embodiments have been presented by way of example only, and are not intended to limit the scope of the disclosure. Indeed, the novel methods and systems described herein may be embodied in a variety of other forms. Furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure. For example, those skilled in the art will appreciate that in various embodiments, the actual steps taken in the process shown in FIG. 6 may differ from those shown in the figure. Depending on the embodiment, certain of the steps described in the example above may be removed, others may be added, and the sequence of steps may be altered and/or performed in parallel. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A data storage system comprising:
   a non-volatile solid-state memory array comprising a plurality of memory units; and
   a controller configured to:
      select a first memory unit of the plurality of memory units for a garbage collection operation based at least on a data age of data stored in the first memory unit;
      perform the garbage collection operation on the first memory unit, wherein the garbage collection operation comprises writing the data stored in the first memory unit to one or more memory units of the plurality of memory units selected from a first list or a second list according to the data age of the data; and
      in response to completion of the garbage collection operation performed on the first memory unit of the plurality of memory units, assign the first memory unit to one of the first list or the second list based at least on a limit on a number of memory units assignable to the first list and a number of program-erase (P/E) operations performed on the first memory unit, the first list being designated for memory units associated with a higher number of P/E operations than memory units assigned to the second list.

2. The data storage system of claim 1, wherein the data includes garbage collected data associated with a relatively higher data age, and the data includes data received from a host system associated with a relatively lower data age, and wherein the controller is further configured to:
   write the garbage collected data to one or more memory units selected from the first list; and
   write the data received from the host system to one or more memory units selected from the second list.

3. The data storage system of claim 1, wherein the controller is further configured to:
   assign timestamps to data written to the plurality of memory units indicative of when the data was written to the plurality of memory units; and
   determine the data age of the data stored in the first memory unit based at least on the timestamps.

4. The data storage system of claim 3, wherein the controller is further configured to:
   maintain a counter indicative of a time duration that the controller is turned on;
   assign the timestamps relative to the counter; and
   determine the data age of the data stored in the first memory unit based at least on a comparison between a first counter value when the data age is determined and a second counter value when the data was written to the first memory unit.

5. The data storage system of claim 1, wherein the controller is further configured to:
   select two or more memory units of the plurality of memory units for the garbage collection operation; and
   perform the garbage collection operation including writing valid data stored in the selected two or more memory units to a single memory unit of the plurality of memory units.

6. The data storage system of claim 5, wherein the controller is further configured to select the two or more memory units for the garbage collection operation so that the data stored in each memory unit of the two or more memory units has the data age within the same data age range of a plurality of data age ranges.

7. The data storage system of claim 6, wherein the plurality of data age ranges comprise a cold data age range not including the data ages below a cold-hot data age threshold, and a hot data age range not including the data ages above the cold-hot data age threshold.

8. The data storage system of claim 1, wherein the controller is further configured to assign the first memory unit to the first list when the number of P/E operations performed on the first memory unit exceeds a first threshold.

9. The data storage system of claim 8, wherein the controller is further configured to assign the first memory unit to the first list when a number of memory units assigned to the first list is less than the limit on the number of memory units assignable to the first list.

10. The data storage system of claim 1, wherein the controller is configured to assign the first memory unit to the second list when the limit on the number of memory units assignable to the first list is reached.

11. In a data storage system comprising a controller and a non-volatile solid-state memory array including a plurality of memory units, a method comprising:
  selecting a first memory unit of the plurality of memory units for a garbage collection operation based at least on a data age of data stored in the first memory unit;
  performing the garbage collection operation on the first memory unit, wherein the garbage collection operation comprises writing the data stored in the first memory unit to one or more memory units of the plurality of memory units selected from selected from a first list or a second list according to the data age of the data; and
  in response to completion of the garbage collection operation performed on the first memory unit of the plurality of memory units, assigning the first memory unit to one of the first list or the second list based at least on a limit on a number of memory units assignable to the first list and a number of program-erase (P/E) operations performed on the first memory unit, the first list being designated for memory units associated with a higher number of P/E operations than memory units assigned to the second list.

12. The method of claim 11, wherein the data includes garbage collected data associated with a relatively higher data age, and the data includes data received from a host system associated with a relatively lower data age, and wherein said writing comprises:
  writing the garbage collected data to one or more memory units selected from the first list; and
  writing the data received from the host system to one or more memory units selected from the second list.

13. The method of claim 11, further comprising:
  assigning timestamps to the data written to the one or more memory units indicative of when the data is written to the one or more memory units; and
  determining the data age of the data stored in the one or more memory units based at least on the timestamps.

14. The method of claim 13, further comprising:
  maintaining a counter indicative of a time duration that the controller is turned on;
  assigning the timestamps relative to the counter; and
  determining the data age of the data stored in the first memory unit based at least on a comparison between a first counter value when the data age is determined and a second counter value when the data is written to the first memory unit.

15. The method of claim 11, further comprising:
  selecting two or more memory units of the plurality of memory units for the garbage collection operation; and
  performing the garbage collection operation including writing valid data stored in the two or more memory units to a single memory unit of the plurality of memory units.

16. The method of claim 15, wherein said selecting comprises selecting the two or more memory units for the garbage collection operation so that data stored in each memory unit of the two or more memory units has the data age within the same data age range of a plurality of data age ranges.

17. The method of claim 16, wherein the plurality of data age ranges comprise a cold data age range not including the data ages below a cold-hot data age threshold, and a hot data age range not including the data ages above the cold-hot data age threshold.

18. The method of claim 11, wherein said assigning comprises assigning the first memory unit to the first list when the number of P/E operations performed on the first memory unit exceeds a first threshold.

19. The method of claim 18, wherein said assigning comprises assigning the first memory unit to the first list when a number of memory units assigned to the first list is less than the limit on the number of memory units assignable to the first list.

20. The method of claim 11, wherein the assigning comprises assigning the first memory unit to the second list when the limit on the number of memory units assignable to the first list is reached.

* * * * *